(12) United States Patent
Du et al.

(10) Patent No.: US 8,265,035 B2
(45) Date of Patent: Sep. 11, 2012

(54) METHOD AND APPARATUS FOR RESELECTING CELL IN MOBILE COMMUNICATION SYSTEM

(75) Inventors: Lei Du, Beijing (CN); Lan Chen, Beijing (CN); Mikio Iwamura, Tokyo (JP); Minami Ishii, Beijing (CN)

(73) Assignee: NTT Docomo, Inc., Tokyo (JP)

( * ) Notice: Subject to any disclaimer, the term of this patent is extended or adjusted under 35 U.S.C. 154(b) by 805 days.

(21) Appl. No.: 12/432,328

(22) Filed: Apr. 29, 2009

(65) Prior Publication Data

US 2009/0270104 A1  Oct. 29, 2009

(30) Foreign Application Priority Data

Apr. 29, 2008  (CN) .......................... 2008 1 0096618

(51) Int. Cl.
*H04J 1/16* (2006.01)
*H04L 12/56* (2006.01)

(52) U.S. Cl. .................. 370/331; 370/252; 370/278

(58) Field of Classification Search .......... 370/252, 370/331, 278
See application file for complete search history.

(56) References Cited

U.S. PATENT DOCUMENTS

2006/0251023 A1 * 11/2006 Choi ............................ 370/331
* cited by examiner

*Primary Examiner* — John Pezzlo
(74) *Attorney, Agent, or Firm* — Blakely, Sokoloff, Taylor & Zafman LLP

(57) ABSTRACT

Embodiments of the present invention include a method for performing cell reselection in a mobile communication system. The method comprises the steps of reading, by a user equipment (UE), the Access Class (AC) barring parameters of the serving cell which are broadcast from a base station, and performing an AC barring check; calculating the cell reselection values of the serving cell and the adjacent cells according to the cell reselection parameters broadcast by the base station when the AC barring check fails; and ranking the calculated cell reselection values, selecting by the UE the cell corresponding to the maximum value of the calculated cell reselection values as the serving cell of the UE.

35 Claims, 6 Drawing Sheets

METHOD AND APPARATUS FOR RESELECTING CELL IN MOBILE COMMUNICATION SYSTEM

PRIORITY

The present application claims priority to and incorporates by reference the entire contents of Chinese patent application, No. 200810096618.7, filed in China on Apr. 29, 2008.

BACKGROUND OF THE INVENTION

1. Field of Invention

The present invention relates to a method and apparatus for reselecting cell in a mobile communication system, more particularly, to a method and apparatus which a user equipment (UE) performs a cell reselection when it transfers from an idle mode to a connection mode, and a base station adjusts cell reselection parameters and handover parameters in the idle mode.

2. Description of Prior Art

As an important organization in mobile communication field, 3GPP (3rd Generation Partnership Project) greatly impelled the standardization progress of 3G (The Third Generation). 3GPP established a series of specifications including Wide Code Division Multiple Access (WCDMA), High Speed Downlink Packet Access (HSDPA), High Speed Uplink Packet Access (HSUPA) and the like for wireless communication system. In order to reply the development of the broadband access technology and the arising of new services, 3GPP started a standardization progress for a long-term Evolution (LTE) technology at the end of 2004. The purposes of the standardization progress relate to further enhancing the spectrum efficiency, improving performances for UEs at edge of a cell, and reducing system delays while providing UEs moving at high-speed with access services of higher rates.

In above-mentioned mobile communication systems, a UE is in an idle (IDLE) state when there is no service for transmission. The UE transfers from the idle state to a connection state when it needs to send a connection establishment request at the time of receiving a service such as a broadcast, paging information and the like from the serving cell in which the UE located. After the connection is established, the UE enters into the connection state.

In order to manage mobility of the UE in idle state, a cell reselection mechanism is defined in mobile communication system. If a certain condition is met, the cell reselection mechanism allows the UE in the idle state to reselect another cell when it transfers to the connection state. The parameters used for performing the cell reselection may be broadcast to the UE through the information broadcast by the base station. LTE system defines the method which the UE executes the cell reselection. Specifically, the UE in the idle state receives a service such as information from its current serving cell. When the UE detects that a Reference Signal Received Power (RSRP) of the serving cell is lower than a predetermined threshold value, it starts to measure the RSRPs of the serving cell and adjacent cells, and enters into the cell reselection decision process. During the cell reselection decision process, the UE calculates cell reselection values of the serving cell and the adjacent cells according to the following formula (1), and ranks the calculated cell reselection values from high to low. If the maximum value of the cell reselection values corresponds to the serving cell in which the UE locates, it is unnecessary for the UE to perform cell reselection. Otherwise, the cell corresponding to the maximum value of the calculated cell reselection values is considered as a target of the cell reselection. Then, the UE will reselect the target cell, and take the reselected cell as its serving cell.

$$R_s = Q_{meas,s} + Q_{hyst}, \quad R_n = Q_{meas,n} - Q_{offsets,n}, \tag{1}$$

where $R_s$ denotes the value of cell reselection value of the serving cell; $R_n$ denotes the value of cell reselection value of the adjacent cells; $Q_{meas,s}$ is the measuring value of RSRPs for cell reselection in the serving cell and $Q_{meas,n}$ is the measuring value of RSRPs for cell reselection the adjacent cells; $Q_{hyst}$ and $Q_{offsets,n}$ are cell reselection parameters of the serving cell, which are broadcast to the UE through the system information of the serving cell, wherein $Q_{hyst}$ represents the hysteresis value used for cell reselection, and $Q_{offsets,n}$ represents the offset between the serving cell and the adjacent cell n. The UE may obtain the cell reselection parameters by reading the broadcasted information of the serving cell.

When the UE requests to establish a connection, the UE first performs an access class barring check. FIG. 1 is a schematic diagram showing an Access Class (AC) with Universal Mobile Telecommunication System (UMTS) as an example. The AC is UE information configured by provider. As shown in FIG. 1, AC 0-9 represents normal UEs, and AC 10 represents an emergency call. States limited by these ACs, i.e. information on whether the UE corresponding to respective ACs is limited, are broadcast to the UE through System Information Block 3 (SIB3). These ACs correspond to respective Access Service Classes (ASCs). The base station broadcasts such a mapping relationship to the UE through System Information Block 5 (SIB5). These ASCs further correspond to different Physical Random Access Channel (PRACH) resources respectively. Each of PRACH resources corresponds to a persistent level parameter for indicating the probability that the UE corresponding to the level performs a random access so that loads of random access channels can be controlled.

A similar access class barring check mechanism is adopted in LTE except the difference that the ACs of the UE are directly mapped to PRACH resources and the mapping relationships with ASCs are cancelled. In addition, the persistent level is indicated by an AC barring parameter. The AC barring parameter comprises an Access probability parameter and an AC barring time parameter, and is used to control the load mapped to RACHs by normal UEs. In LTE, the AC barring parameter located in SIB2 and is broadcast to UEs by base stations.

FIG. 2 is a flowchart showing the access class barring check process when a UE transfers from the idle state to the connection state. When the UE requests to establish the connection, the UE first reads the broadcast system information of the serving cell to acquire the AC barring parameter of the cell at step S201. In LTE, the AC barring parameter is contained in SIB2 and broadcast to the UE by the base station. In general, the AC barring parameter includes an access probability and an AC barring time. Next, at step S202, the UE determines whether a timer T303 is zero or not. Herein, the timer T303 is a random number started at the time when the AC barring check fails. The size of the random number associates with the AC barring time contained in the AC barring time parameter, and is used to decide the time barred for the next AC barring check of the UE.

If it determines at step S202 that the timer is not zero, which means the UE is in the barring time after the failure of the AC barring check, the process returns to step S201. In this case, the UE can not perform an AC barring check. Only when it determines at step S202 that the timer is zero, the process proceeds to step S203. At step S203, the UE generates a value in the range of 0 to 1, and then the process proceeds to step S204. At step S204, the generated value is compared with the read access probability. If compared result shows that the generated value is less than the access probability, the process proceeds to step S205. At step S205, the UE determines that the AC barring check is successful. After that, the UE sends a random access preamble sequence through a random access channel immediately, and starts a random access process. On the contrary, if the compared result at step S204 shows that the generated value is equal to or larger than the access probability, the process turns to step S206 where the UE calculates a random number according to the read AC barring time and starts the timer T303 according to the random number. At that time, it determines that the AC barring check fails at step S207, and then the process returns to step S201 where the UE reads the broadcast information of the serving cell.

In general, the calculation method for the timer T303 is specified in LTE. The calculation is operated according to T303=(1−a+2a*rand)*T, wherein a is a number less than 1, for which 0.3 is proposed in the LTE specification, rand denotes a random number between 0 and 1, and T denotes an AC barring time read by the UE from the serving cell. When the timer is not zero, the UE may perform the cell reselection.

The process as shown in FIG. 2 generates two kinds of results for AC barring check. On one hand, if the AC barring check is successful, the UE will send a random access preamble sequence and start a random access process. On the other hand, if the AC barring check fails, it is possible to generate three cases as follows: 1) the UE retries the AC barring check after the timer expires, which can not effectively ensure a successful AC barring check of the UE and may introduce a longer access time delay due to a plurality of failures for the AC barring check operation if the access probability of the serving cell is very low; 2) the UE gives up the AC barring check when the retrying number achieves a set maximum value which considers the failure of the connection and reduces the satisfaction degree of the UE; 3) the UE reselects another cell during the timer is not zero, the UE may perform an AC barring check in the reselected cell and inefficient retrying due to too low access probability of the original serving cell can be avoid. However, if the access probability of the reselected target cell is still lower than that of the current serving cell, such a cell reselection may further reduce the probability that the UE performs an AC barring check successfully and increases the access time delay for the UE.

Therefore, it is necessary to provide a method and apparatus which UE can perform the AC barring check in the cell with a higher access probability in taking account of the access probabilities of the serving cell and the adjacent cells during the cell reselection, thereby increasing the probability that the UE performs the AC barring check successfully. In this way, the UE is capable of entering into the random access process at a higher speed and reducing the access time delay caused by the AC barring check.

SUMMARY OF THE INVENTION

Embodiments of the present invention are made in view of the above problems. Embodiments of the present invention include a method and apparatus for performing a cell reselection in a mobile communication system when the UE transfers from idle mode to connection state. The method and apparatus changes the cell reselection values according to the access probability of the serving cell so that the UE in the serving cell with lower access probability can perform the cell reselection at a higher probability, and reduces the access time delay in the serving cell due to many times of retrying.

Other embodiments of the present invention include a method and apparatus for dynamically adjusting the cell reselection parameters in a mobile communication system by the base station. The method and apparatus changes the offset of the cell reselection according to the access probabilities of the serving cell and its adjacent cells so that the UE in idle state can reselect the cell with higher access probability In addition, the method and apparatus of the present invention may implement load balance in the idle state, and enhances the call success rate of the UEs.

One embodiment of the present invention provides a method for performing cell reselection in a mobile communication system. The method comprises the steps of: reading, by a user equipment (UE), the Access Class (AC) barring parameters of the serving cell which are broadcast from a base station, and performing an AC barring check; calculating the cell reselection values of the serving cell and the adjacent cells according to the cell reselection parameters broadcast by the base station when the AC barring check fails; and ranking the calculated cell reselection values, selecting by the UE the cell corresponding to the maximum value of the calculated cell reselection values as the serving cell of the UE.

According to another embodiment of the present invention, it provides an apparatus for performing a cell reselection in a mobile communication system, comprising:

at a user equipment (UE) side, a transmission/reception unit for transmitting and receiving information via a wireless interface;

an Access Class (AC) barring check and decision unit for reading the AC barring parameters, and performing an AC barring check and decision based on the read AC barring parameters;

a measuring unit for measuring RSRPs of the current serving cell and its adjacent cells; and a cell reselection value calculation and decision unit for performing the cell reselection operation according to the measuring result from the measuring unit, the AC barring parameters supplied from the AC barring check and decision unit and the received cell reselection parameters.

According to yet another aspect of the present invention, it provides a method for performing a cell reselection in a mobile communication system, comprising the steps of: calculating, by a base station, cell reselection parameters and periodically broadcasting the calculated cell reselection parameters, Access Class (AC) barring parameters and system information to a UE in the mobile communication system; receiving, by user equipment (UE), the cell reselection parameters and the AC barring parameters sent from the base station, and calculating cell reselection values of a current serving cell and its adjacent cells; and ranking, by the UE, the calculated cell reselection values, and selecting the cell corresponding to the maximum value of the calculated cell reselection values as its serving cell.

According to another aspect of the present invention, it provides an apparatus for performing a cell reselection in a mobile communication system, comprising:

an adjusting factor decision unit for determining an adjusting factor according to cell reselection parameters received from respective base stations or load status and cell reselection parameters of respective base stations;

an offset updating unit for receiving access probabilities of respective base stations, offsets between the base station of the current serving cell and the base stations of the adjacent cells, and cell reselection parameters of respective cells, and for calculating and updating the offsets between the current serving cell and the adjacent cells and/or the handover parameters; and a transmission/reception unit for exchanging information between the base stations, or between the base stations and a control unit.

According to the present invention, cell reselection value by which the UEs perform the cell reselection is changed based on the access probabilities of the serving cell which the UE locates and/or its adjacent cells. In this case, the UEs may reselect the cell having higher access probability at higher probability to avoid the reselection of an adjacent cell of which access probability is even worse than that of the current serving cell.

The present invention enables the UEs to reselect the cell having higher access probability at higher probability, increases the probability that the UEs perform AC barring check successfully and reduces the access time delay caused by performing the AC barring check.

BRIEF DESCRIPTION OF THE DRAWINGS

The above embodiments of the present invention will be apparent from the following detailed description on the preferred embodiments taken conjunction with the drawings in which:

FIGS. 9a and 9b are schematic diagrams showing dynamically adjusting the cell reselection parameters and/or the handover parameters of the serving cell and the adjacent cell n at the base station according to another embodiment respectively, wherein FIG. 9a is a schematic diagram showing that the base stations exchange information in a distributed manner, and FIG. 9b is a schematic diagram showing that the base stations exchange information in a centralized manner; and FIGS. 10a to 10c show a device of dynamically adjusting the cell reselection parameter according to methods as shown in FIGS. 9a and 9b respectively, wherein FIG. 10a is a schematic block diagram showing an apparatus exchanging information in the distributed manner at the base stations, FIG. 10b is a schematic block diagram showing an apparatus exchanging information in the centralized manner at the base stations,
and FIG. 10c is a schematic block diagram showing a control unit exchanging information in the centralized manner.

DETAILED DESCRIPTION OF PREFERRED EMBODIMENTS

Now, a detailed description will be given to the embodiments of the present invention with reference to the figures. In the description, any element or function unnecessary to the description of the present invention will be omitted in order not to obscure the present invention.

First Embodiment

A first embodiment of the present invention will be described with reference to the attached drawings. In the first embodiment, a user equipment (UE) adjusts the cell reselection value according to the access probability of the serving cell so that the UE in the serving cell with lower access probability may more often perform cell reselections.

Figure 2:
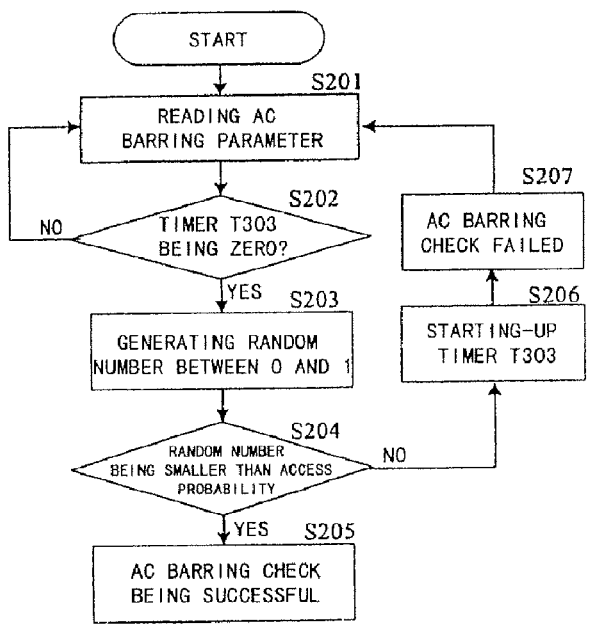
FIG. 2 is a flowchart showing the AC barring check executed by the UE.
Figure 3:
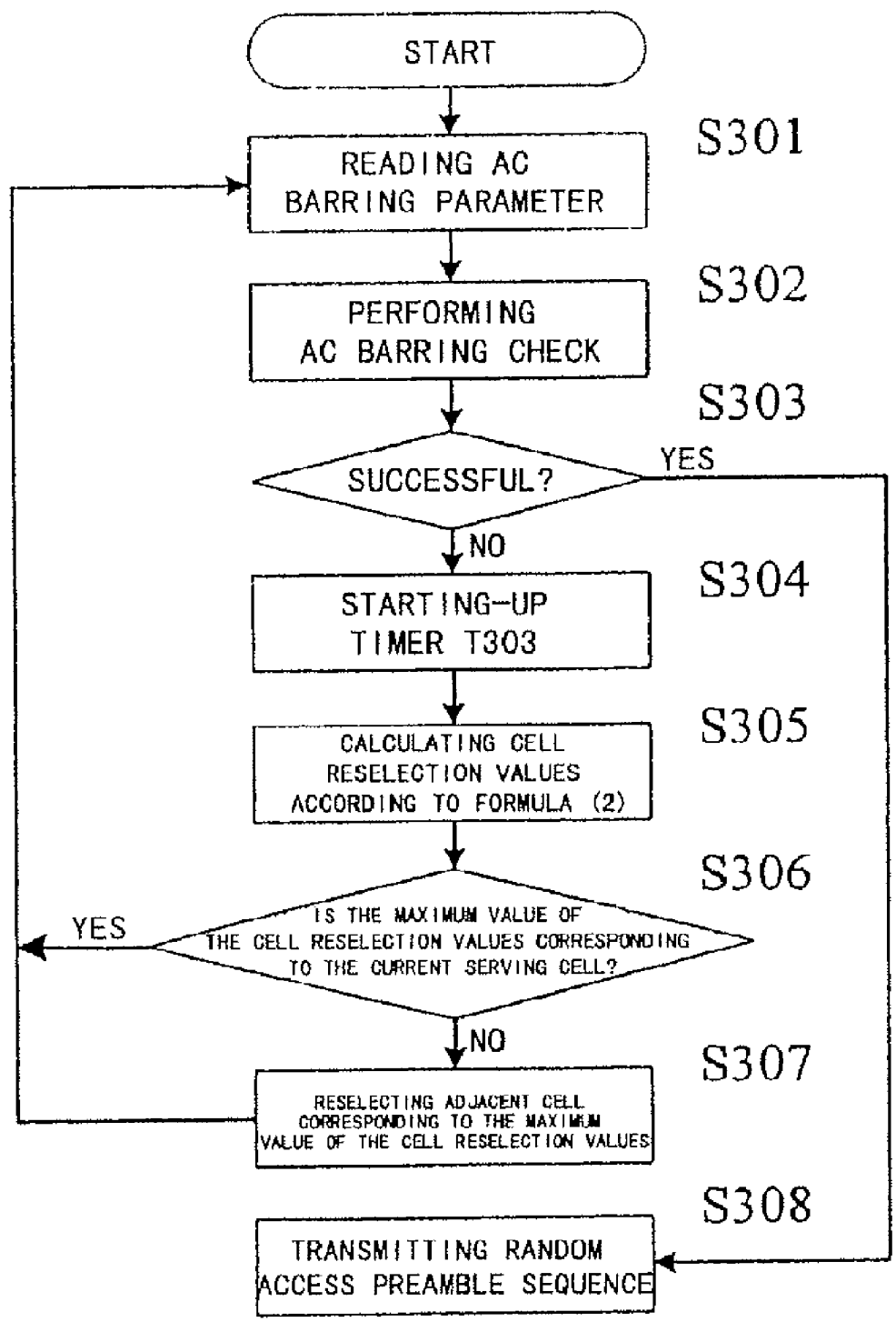
FIG. 3 is a flowchart showing a process example of the cell reselection when the UE transfers from the idle mode to the connection mode according to an embodiment of the present invention.

FIG. 3 is a flowchart showing a process example of the cell reselection when the UE transfers from the idle mode to the connection mode according to the first embodiment of the present invention. As shown in FIG. 3, at step S301, the UE reads information broadcast by the base station within the serving cell to acquire the AC barring parameters of the cell when the UE needs to initiate a connection establishment request. Generally, as described above, the AC barring parameters in LTE system includes two parameters, i.e. an access probability and an AC barring time. The parameters are broadcasted to the UE within a system information block 2 (SIB2). At step S302, the UE performs the AC barring check according to the read AC barring parameters. That is, the UE performs the check according to steps S202-S204 as shown in FIG. 2.

When the timer T303 indicates zero, a random number is generated in the range of 0 to 1. The generated random number is compared with the access probability corresponding to the AC of the UE in the AC barring parameters. At step S303, when it determines that the generated random number is smaller than the access probability corresponding to the AC of the UE, this AC barring check is successful. In this case, the process proceeds to step S308, the UE sends a random access preamble sequence and then starts the random access process. If it determines that the AC barring check fails at step S303, the process proceeds to step S304. At step S304, the UE starts up the timer T303. The value of the timer T303 is a random number associated with the AC barring time. In LTE, the value of the timer T303 is calculated with the formula T303= (1−a−2*a*rand)*T, wherein a is 0.3 and rand is a random number in the range from 0 to 1. Next, at step S305, the UE calculates the cell reselection values according to the following formula (2), and ranks the calculated cell reselection values from high to low.

$$R_s' = Q_{meas,s} + Q_{hyst} - (1-p_{i,s})*\Delta Q_s, \quad R_n = Q_{meas,n} - Q_{offset,n} \qquad (2)$$

where $R'_s$ is the cell reselection value of the serving cell, $R_n$ is the cell reselection value of the adjacent cell n; $Q_{meas,s}$ is the measuring value of RSRPs for the cell reselection of the current serving cell and $Q_{meas,n}$ is the measuring value of RSRPs for the cell reselection of the adjacent cell n; $Q_{hyst}$ and $Q_{offset,n}$ are cell reselection parameters contained in the system information of the current serving cell and are broadcast to the UE through the system information, wherein $Q_{hyst}$ represents a hysteresis value of the cell reselection, and $Q_{offset,n}$ represents the offset between the current serving cell and the adjacent cell n, respectively; $p_{i,s}$ is the access probability value corresponding to the access class (AC) i of the UE within the current serving cell; and $\Delta Q_s$ is defined as the adjusting factor indicating the adjusting range to the cell reselection parameters when the AC barring check fails. The bigger the $\Delta Q_s$ is, the bigger the adjusting range of which the UE may adjust the cell reselection parameter is. $\Delta Q_s$ may be calculated by the UE according to the received cell reselection parameters. Typically, for example, $\Delta Q_s$ is equal to the sum of $Q_{hyst}$ and $Q_{offsets,n}$. When there are a plurality of received $Q_{offsets,n}$s, it is possible to add the maximum value or the minimum value of the plurality of $Q_{offsets,n}$s to $Q_{hyst}$. Alternatively, $\Delta Q_s$ may be broadcast to the UE by the base station through the system information, for example, by setting $\Delta Q_s$ into the AC barring parameters to broadcast to the UE. The value of $\Delta Q_s$ may be decided by the base station based on load information of the current serving cell and the adjacent cells. The bigger the load of the current serving cell is and the smaller the load of the adjacent cell is, the bigger the $\Delta Q_s$ is.

At step S306, the UE determines whether the maximum value of the calculated cell reselection values correspond to the current serving cell or not based on the calculated results at step S305. If it is, the process returns to step S301. This means that it is unnecessary for the UE to perform the cell reselection and the UE may continues to read the AC barring parameters of the current serving cell to prepare next cell reselection. When the AC barring parameters of the current serving cell change, the AC barring check is performed with latest parameters. If the maximum value of the cell reselection values calculated at step S306 corresponds to another cell, it indicates that the UE needs to change the current serving cell. In this case, the process proceeds to step S307, the UE performs the cell reselection, and reselects the cell corresponding to the maximum value of the cell reselection criteria as its serving cell. Then, the process returns to step S301, the UE reads the AC barring parameters in the new serving cell, and performs the AC barring check according to the parameters.

In this embodiment, the UE calculates cell reselection value according to the formula (2), i.e., subtracts a value associated with the access probability and adjusting factor of the current serving cell on a basis of the method for calculating cell reselection value for the current serving cell in the prior art. In this way, the lower the access probability of the cell is, the lower the calculated reselection value of the current serving cell is, thereby increasing the probability that the UE performs the cell reselection. In addition, the bigger the adjusting factor is, the more the UEs are able to perform cell reselections.

Although the probability that the UE performs the cell reselection in the cell of the lower access probability may increase with the calculation result of the formula (2), the formula (2) does not take account of the access probabilities of the adjacent cells. Therefore, it is possible for the UE to reselect a cell with lower access probability than that of the original serving cell and result in the deterioration in the access performance.

In order to solve this problem, in another example of the first embodiment, a formula (3) is provided for calculating cell reselection value in consideration of the access probability of the adjacent cells. With the formula (3), disadvantages resulted from above formula (2) can be overcome. In particular, it is possible to combine the formula (2) with the formula (3) in specific embodiments. When the UE determines that the access probability of adjacent cell is higher than that of the current serving cell, it uses the formula (2) to calculate the cell reselection value for the current serving cell. When the UE determines that the access probability of the adjacent cell is lower than that of the current serving cell, it uses the formula (3) to calculate the cell reselection value for the adjacent cell. The formula (3) expresses as follow.

$$R'_s = Q_{meas,s} + Q_{hyst} - (1-p_{i,s})*\Delta Q_s, R'_n Q_{meas,n} - Q_{offsets,n} - (1-p_{i,n})*\Delta Q_s \quad (3)$$

where $R'_s$ is the cell reselection value for the serving cell, $R_n$ is the cell reselection value for the adjacent cell n (n is an integral number), $Q_{meas,s}$ is the measuring value of RSRPs for the cell reselection in the current serving cell, $Q_{meas,n}$ is the measuring value of RSRPs for the cell reselection in the adjacent cell, $Q_{hyst}$ and $Q_{offset,n}$ are the cell reselection parameters which are included in the system information of the current serving cell and are broadcast to the UE through the system information, wherein $Q_{hyst}$ represents a hysteresis value of the cell reselection, and $Q_{offsets,n}$ represents the offset between the current serving cell and the adjacent cell n; $p_{i,s}$ is the access probability value corresponding to the AC i of the UE in the current serving cell, $p_{i,s}$ is the access probability value corresponding to the AC i of the UE in the adjacent cell n; $\Delta Q_s$ is defined as a adjusting factor indicating the adjusting range for cell the reselection parameter when the AC barring check fails. The bigger the $\Delta Q_s$ is, the bigger the adjusting range of which the UE may adjust the cell reselection parameter is. $\Delta Q_s$ may be calculated by the UE according to the received cell reselection parameter. Typically, $\Delta Q_s$ equals to the sum of $Q_{hyst}$ and $Q_{offsets,n}$. When there are a plurality of received $Q_{offset,n}$, it is possible to add the maximum value or the minimum value of the plurality of $Q_{offsets,n}$ to $Q_{hyst}$. Alternatively, $\Delta Q_s$ may also be broadcast to the UE through the system information by the base station, for example, by placing $\Delta Q_s$ into the AC barring parameters. A specific value of $\Delta Q_s$ may be decided by the base station based on load information of the current serving cell and the adjacent cell. The bigger the loads of the current serving cell and the smaller the load of the adjacent cell are, the bigger the $\Delta Q_s$ may become.

Figure 4:
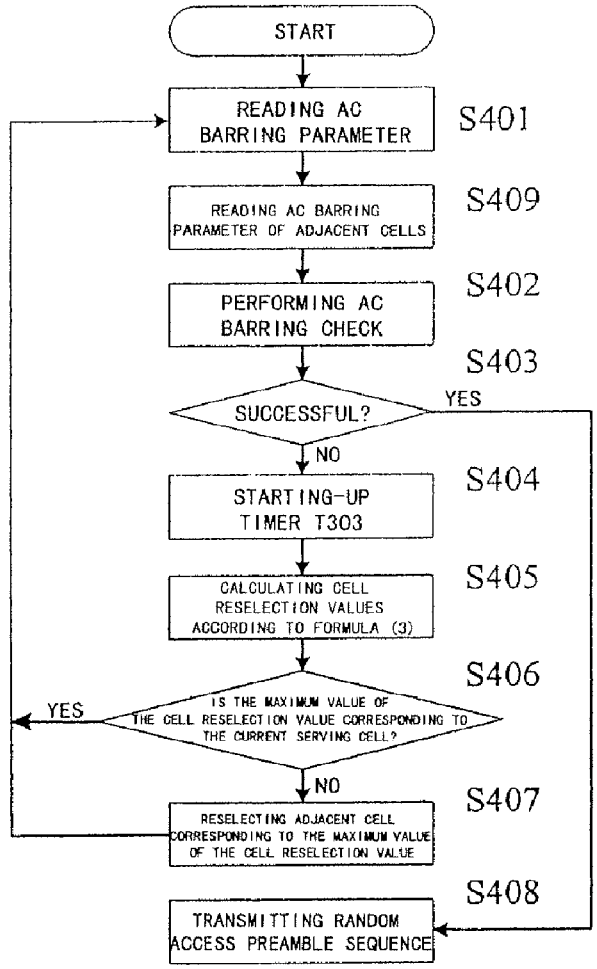
FIG. 4 is flowchart showing another process example of the cell reselection when the UE transfers from the idle mode to the connection mode according to another embodiment of the present invention.

FIG. 4 is a flowchart showing the UE performs the cell reselection according to the formula (3) when it transfers from the idle mode to the connection mode. The operations of steps S401-S404 in FIG. 4 are substantively the same with those of steps S301-S304 as shown in FIG. 3 except the UE needs to read an AC barring parameters of the adjacent cells (step S409 following step 401) in addition to read the AC barring parameters of the serving cell. This may be implemented by setting the UE to read the broadcast system information such as SIB 2 of the adjacent cell during performing a measurement to the adjacent cell. At step S402, the AC barring check is performed. Then, at step S403, it determines whether the check is successful or not. When it determines that the check is successful at step S403, the process proceeds to step S408, the UE sends a random access preamble sequence and starts a random access process. On the other hand, when it determines that the AC barring check fails at step S403, the process proceeds to step S404, the timer T303 starts up. Then, the process proceeds to step S405, the cell reselection values are calculated according to the formula (3), and cells are ranked from high to low according to the calculated values.

Operations (steps S406-S408) following the calculation of the cell reselection values are completely the same as those of step S306-S308 as shown in FIG. 3, descriptions for which are omitted here.

In the formula (3), the calculation of the cell reselection value for the current serving cell is same as that in the formula (2). For the calculation of the cell reselection value for the adjacent cell, a value related with the access probability and adjusting factor of the adjacent cell is subtracted based on the method for calculating the cell reselection value for the adjacent cell in the prior art. The lower the access probability of the adjacent cell is, the bigger the subtracted value is. As a result, the probability that the UE reselects this adjacent cell is reduced. In addition, the bigger the adjusting factor is, the lower the cell reselection value for the adjacent cell is, and the possibility that the cell is reselected is reduced.

Figure 5:
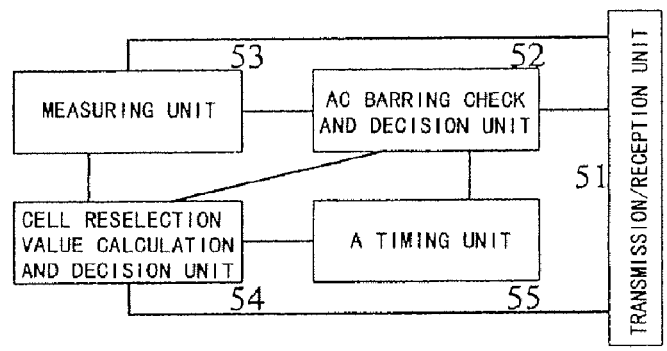
FIG. 5 is a schematic block diagram showing an apparatus performing the cell reselection processes as shown in FIGS. 3 and 4 at the UE side according to an embodiment of the present invention.
Figure 6:
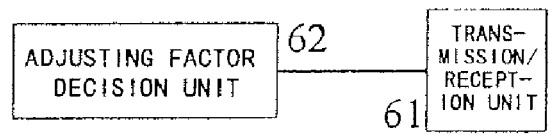
FIG. 6 is a schematic block diagram showing an apparatus performing the cell reselection as shown in FIG. 4 and broadcasting the adjusting factor to the UEs at the base station side.

FIGS. 5 and 6 are schematic block diagrams showing the cell reselection apparatus according to the first embodiment of the present invention. FIG. 5 shows the cell reselection apparatus arranged at a UE side; FIG. 6 shows a schematic diagram of the cell reselection apparatus arranged at a base station (eNodeB) side.

The construction and operation of the cell reselection apparatus arranged at the UE side is described with reference to FIG. 5. As shown in FIG. 5, the cell reselection apparatus arranged at the UE side comprises a transmission/reception unit 51, an AC barring check and decision unit 52, a measuring unit 53, a cell reselection value calculation and decision unit 54, and a timing unit 55. For the sake of simplification, only the operations related with the present invention will be described. The contents that are not closely related with the present invention will be omitted.

At the UE side, the transmission/reception unit 51 transmits and receives information via a wireless interface. The transmitted and received information includes broadcast information, special information for the UE and the like. The measuring unit 53 measures RSRPs or RSRQs (Reference Signal Received Quality) received by the transmission/reception unit 51 from the serving cell and adjacent cells, and sends measuring results to the cell reselection value calculation and decision unit 54. In addition, the measuring unit 53 starts to measure a wireless channel when it receives an instruction of starting a channel measurement from the AC barring check and decision unit 52. The AC barring check and decision unit 52 reads the AC barring parameters from the broadcast information of the current serving cell received by the transmission/reception unit 51, and performs the AC barring check and decision according to the read parameters and information of the timing unit 55. When the cell reselection value calculation and decision unit 54 calculates and decides the cell reselection value according to the formula (2) or formula (3), the AC barring check and decision unit 52 reads the AC barring check parameters of the adjacent cell. If the unit 52 determines that the AC barring check is successful, the AC barring check and decision unit 52 sends the determined result to the transmission/reception unit 51 which in turn sends a random access preamble sequence to start a random access process. When the AC barring check fails, the AC barring check and decision unit 52 calculates a random number according to the AC barring time parameter in the AC barring parameters received by the transmission/reception unit 51, and sends the random number to the timing unit 55 to start-up the timer.

In addition, when the AC barring check fails, the AC barring check and decision unit 52 further sends the result to the measuring unit 53 and the cell reselection value calculation and decision unit 54 in order to start-up the measuring process and the cell reselection process. The timing unit 55 starts-up the timer according to the number inputted from the AC barring check and decision unit 52, and then performs the timing operation. The cell reselection value calculation and decision unit 54 performs the cell reselection operation according to the measuring result provided by the measuring unit 53, the AC barring parameters received from the AC barring check and decision unit 52, the cell reselection parameters received by the transmission/reception unit 51. In addition, the cell reselection value calculation and decision unit 54 calculates and decides the cell reselection values according to the formula (2) or the formula (3) when it receives the result from the AC barring check and decision unit 52. The decision result made by the cell reselection value calculation and decision unit 54 sends to the transmission/reception unit 51 when it determines to reselect to another cell. Then, the transmission/reception unit 51 starts to receive information from another cell which is reselected as the target cell. During the cell reselection value calculation and decision unit 54 performs the calculation of the formula (2) or the formula (3), if the adjusting factor $\Delta Q_s$ is decided by the UE, the cell reselection value calculation and decision unit 54 needs to calculate the adjusting factor according to the cell reselection parameters received by the transmission/reception unit 51, for example, $\Delta Q_s$ equals to the sum of $Q_{hyst}$ and $Q_{offsets,n}$. If there are a plurality of received $Q_{offsets,n}$, it is possible to add the maximum value or the minimum value of the plurality of received $Q_{offsets,n}$ to $Q_{hyst}$. When the adjusting factor $\Delta Q_s$ is broadcast to the UE by the base station through the system information, for example, in the AC barring parameters, the UE may directly read the adjusting factor from the information received by the transmission/reception unit 51 and calculates the cell reselection value.

Hereinafter, the construction and operation for the cell reselection apparatus arranged at a base station will be described with reference to FIG. 6. The cell reselection apparatus as shown in FIG. 6 performs the cell reselection according to the process as shown in FIG. 4 and broadcasts the adjusting factor to the UE by the base station. It should be noted that, for the sake of simplification, only the operations related with the present invention will be described, and the contents that are not closely related with the present invention will be omitted. As shown in FIG. 6, the cell reselection apparatus arranged at the base station comprises a transmission/reception unit 61 and an adjusting factor decision unit 62. The transmission/reception unit 61 transmits and receives information via a wireless interface. The adjusting factor decision unit 62 decides the adjusting factor of the cell covered by the base station according to load status of the current serving cell and the adjacent cells. The smaller the load of the current serving cell is and the bigger the load of the adjacent cell is, the bigger the adjusting factor may become. The adjusting factor decision unit 62 sends the decided adjusting factor to the transmission/reception unit 61 which in turn broadcasts the decided adjusting factor to the UE.

Functions of each unit comprised in the cell reselection method and apparatus One embodiment of the present invention can be implemented not only by hardware loaded into the UE and the base station, but also by software, or the combination of the hardware and the software. Those skilled in the art may implement the present invention with various methods by use of concepts and schemes of the present invention described herein.

The cell reselection method and apparatus according to the first embodiment of the present invention are implemented with a calculating method for autonomously adjusting the cell reselection value at the UE side. Besides this, a second embodiment below will provide a method and apparatus for dynamically adjusting cell reselection parameters by the base station, which can implement the effect and performance similar with that of the autonomously adjusting at the UE side.

Second Embodiment

The second embodiment provides a method and apparatus for dynamically adjusting the cell reselection parameters by the base station, which can implement the effect and performance similar with that of the autonomously adjusting at the UE side.

Figure 1:
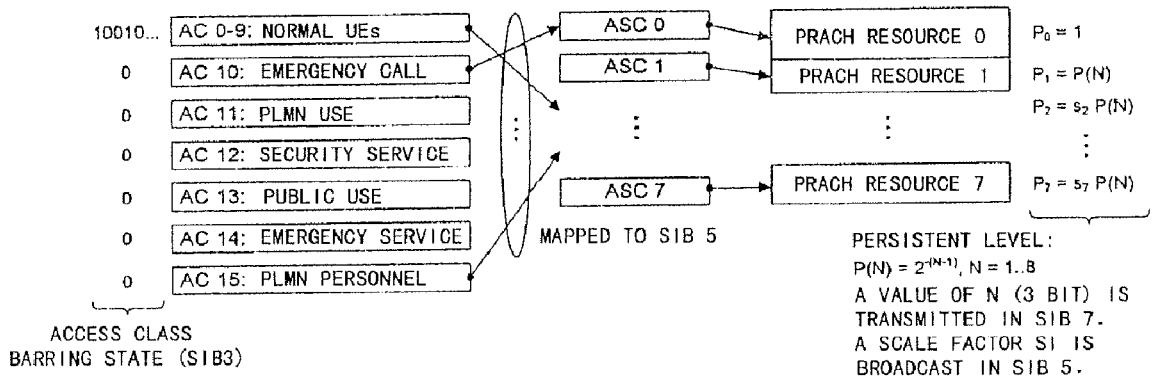
FIG. 1 is a schematic diagram showing an access class (AC) with a UMTS mobile communication system as an example.
Figure 7:
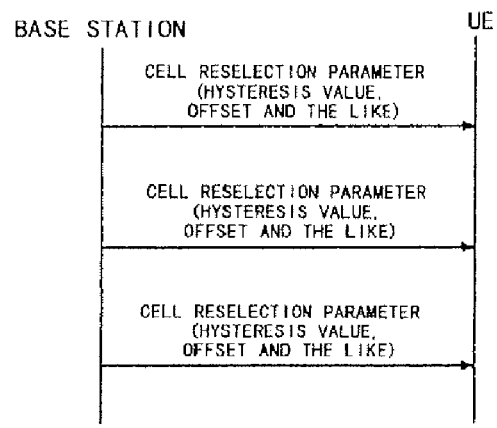
FIG. 7 is a schematic diagram showing the process of dynamically adjusting the offset between the current serving cell and the adjacent cell n in the cell reselection parameters at the base station.

FIG. 7 is a schematic diagram showing the process that the base station dynamically adjusts the offsets between the serving cell and the adjacent cell n in the cell reselection parameters. During this process, the base station calculates the cell reselection parameters, and periodically broadcasts the calculated cell reselection parameters, the AC barring parameters and other system information to the UEs in the mobile communication system. In the second embodiment, the base station calculates the offsets between the current serving cell and the adjacent cell n in the cell reselection parameters according to the following formula (4), and places the calculated offsets into the cell reselection parameters to broadcast to the UE. Herein, it is possible to adjust the offsets with respect to one or several adjacent cells. It is also possible to adjust offsets with respect to all adjacent cells. If there are a plurality of adjacent cells as candidate cells of the current serving cell, the base station calculates offsets between the current serving cell and these adjacent cells according to the formula (4) respectively, and then broadcast the calculated offsets to the UE.

$$Q_{offsets,n}' = Q_{offsets,n} - (1-p_s)*\Delta Q_s \quad (4)$$

where $Q_{offsets,n}'$ represents the adjusted offsets between the current serving cell and the adjacent cell n, which is decided by the base station; $Q_{offsets,n}$ represents the offsets between the current serving cell and the adjacent cell n before the adjusting, which is decided by the base station; $p_s$ denotes the access probability value corresponding to an AC of the normal UE in the current serving cell, for example, the access probability value corresponding to a UE of AC 0-9 as shown in FIG. 1; $\Delta Q_s$ is the adjusting factor indicating the adjusting range of the offsets between the current serving cell and the adjacent cell, which may be obtained by the base station according to the existing cell reselection parameters. Generally, $\Delta Q_s$ equals to the sum of $Q_{hyst}$ and $Q_{offsets,n}$. When the base station has a current serving cell and a plurality of adjacent cells, the maximum value or the minimum value of the plurality of $Q_{offsets,n}$ may be added to $Q_{hyst}$. Alternatively, $\Delta Q_s$ may also be determined by the base station according to load status of the current serving cell and/or the adjacent cells.

Figure 8:
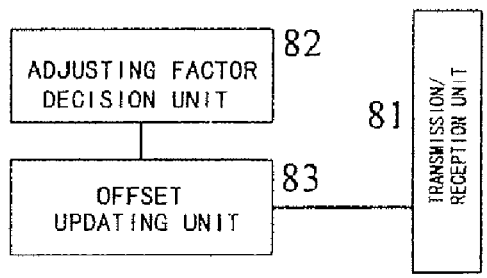
FIG. 8 is a schematic block diagram showing an apparatus dynamically adjusting the offset between the current serving cell and the adjacent cell n in the cell reselection parameters with the process as shown in FIG. 7.

FIG. 8 is a schematic diagram showing the apparatus for adjusting the cell reselection parameters at a base station. As shown in FIG. 8, the cell reselection parameter adjusting apparatus arranged at the base station comprises a transmission/reception unit 81, an adjusting factor decision unit 82 and an offset updating unit 83. The transmission/reception unit 81 transmits and receives information via a wireless interface. The adjusting factor decision unit 82 decides the adjusting factor according to load status of the current serving cell and/or the adjacent cells, or acquires the adjusting factor according to existing cell reselection parameters, and then sends the adjusting factor to the offset updating unit 83. The offset updating unit 83 calculates and updates the offsets between the current serving cell and the adjacent cell n according to the formula (4) as described above, and places the calculation results into the system information such as the cell reselection parameters to transmit to the UE by the transmission/reception unit 81.

It should be appreciated that in the second embodiment, after receiving broadcast information from the base station, the UE performs the cell reselection according to a traditional cell reselection value based on the received adjusted offset and other cell reselection parameters. The second embodiment differs from the first embodiment in that the offset used for calculating the cell reselection value by the UE is the offset adjusted According to one embodiment of the present invention, which is broadcast by the base station.

Figure 9A:
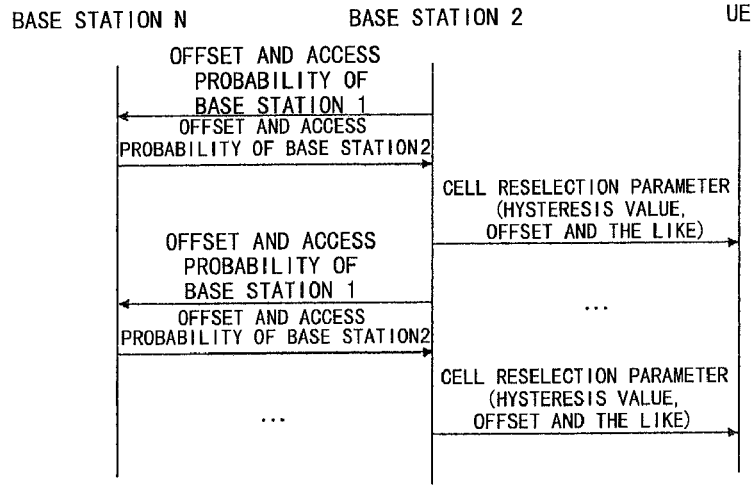
Figure 9B:
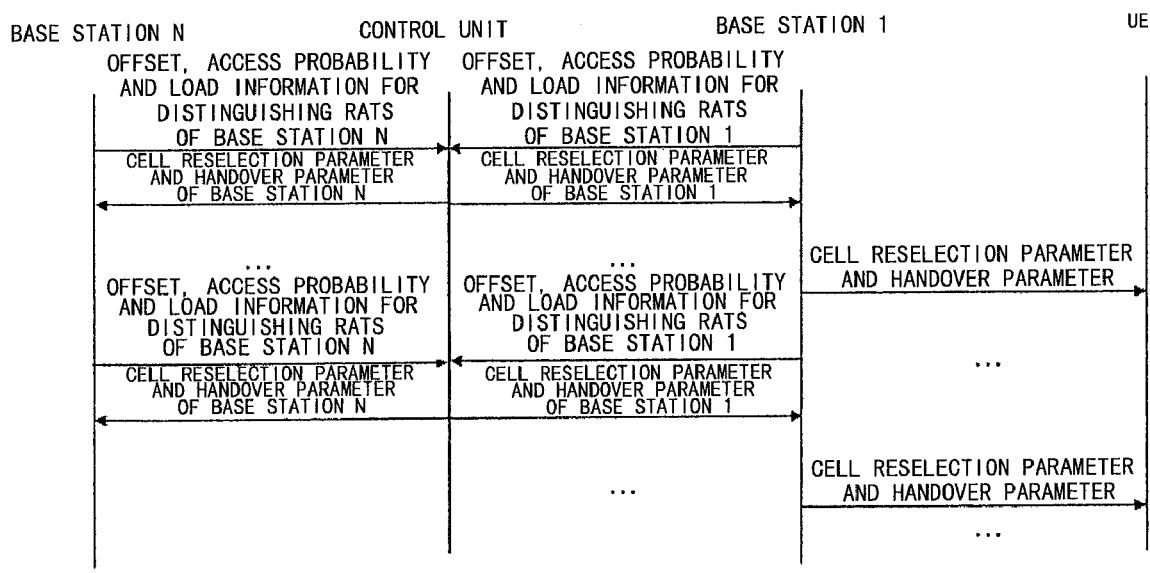

Similar to the method of the first embodiment as shown in FIG. 3, in the method as shown in FIG. 7, the base station only takes account of the access probability of the current serving cell. When the access probability of the current serving cell is higher than that of the adjacent cell, the access performance may degrade. To this end, FIGS. 9a and 9b show schematic diagrams of methods for eliminating defects contained in the method as shown in FIG. 7. In the cell reselection methods as shown in FIGS. 9a and 9b, the base station dynamically adjusts the offsets between the serving cell and the adjacent cell n according to the following formula (5).

$$Q_{offsets,n}'' = Q_{offsets,n} - (1-p_s)*\Delta Q_s + (1-p_n)*\Delta Q_s \quad (5)$$

where $Q_{offsets,n}''$ represents the offsets between the current serving cell and the adjacent cell n, which are determined by the base station in the present invention; $Q_{offsets,n}$ represents the offsets between the current serving cell and the adjacent cell n, which are determined by the base station in the prior art; $p_s$ denotes the access probability value corresponding to the AC of the normal UE in the current serving cell, for example, an access probability value corresponding to a UE of AC 0-9 in FIG. 1; $p_n$ denotes the access probability value corresponding to the AC of the normal UE in the adjacent cell n, for example, another access probability value corresponding to a UE of AC 0-9 in FIG. 1; $\Delta Q_s$ is the adjusting factor indicating the adjusting range of the offsets between the current serving cell and the adjacent cell n, which may be obtained by the base station according to existing cell reselection parameters. Generally, $\Delta Q_s$ equals to the sum of $Q_{hyst}$ and $Q_{offsets,n}$. When the base station has one current serving cell and a plurality of adjacent cells, the maximum value or the minimum value of the plurality of $Q_{offsets,n}$ may be added to $Q_{hyst}$. Alternatively, $\Delta Q_s$ may also be determined by the base station according to load status of the current serving cell and/or the adjacent cells.

As shown in FIG. 9a, first, the base station 1 exchanges respective offsets and the access probability values with the base station n of at least one adjacent cell n, n is an integer equal to or bigger than 1. Here, the access probability values may be those for all ACs. In order to reduce signaling overhead, the access probability values may also be the access probability values corresponding to the AC of the normal UEs. For example, the base station 1 sends the offsets between itself and base station n and the access probability value of itself to the base station n, the base station n also sends the offsets between itself and base station 1 and the access probability value of itself to the base station 1. Both the base station 1 and the base station n may either send the information immediately after receiving information sent from the other party, or send the information independently from each other. In addition, such an information exchange may be either periodical or event-triggered. For example, when a certain base station detects a change in its offsets and/or access probability values, the base station sends latest information to other adjacent base stations. With such a information exchanging, the base station of the current serving cell can acquire the information on the access probability values and offsets of other cells in order to calculate the offsets of the current serving cell according to the formula (5) as described above and place the calculated offsets into the cell reselection parameter to broadcast to the UE.

In FIG. 9a, base stations exchange information such as the offsets and the access probability values in a distributed manner. FIG. 9b is a schematic diagram showing base stations exchange information such as the offsets and the access probability values in a centralized manner. As shown in FIG. 9b, each base station sends the offsets, the access probability values and other cell reselection parameters of the current serving cell to a control unit. In addition, if one cell has UEs supporting other Radio Access Technology (RATs) besides the RAT used by the cell, the base station may further send load information for distinguishing the RATs to the control unit. The load information for distinguishing the RATs may be the number of UEs corresponding to each of RATs, staying in the connection state in the current serving cell and supporting the RATs. For example, the number of UEs staying in the connection state in the current serving cell and supporting LTE is N1, and the number of UEs staying in the connection state in the current serving cell and supporting WCDMA is N2. Or, the load information may be the number of Physical Resource Blocks (PRBs) occupied by UEs corresponding to each of RATs, staying in the connection state in the current serving cell and supporting the RATs, which may be further refined as PRBs of a Random Access Channel (RACH) and PRBs of a Common Control Channel (CCCH) occupied by UEs corresponding to each of RATs, staying in the connection state in the current serving cell and supporting the RAT. Further, the load information may be data amount in buffers of UEs corresponding to each of RATs, staying in the connection state in the current serving cell and supporting the RATs. Base on the information as described above, the base station may better adjust the cell reselection parameters and/or the handover parameters of the current serving cell with respect to adjacent cells with different RATs in order to implement a load balance. For example, the base station may determine the cell reselection parameters and/or the handover parameters for the cells by exchanging information with a adjacent cell on the number of UEs corresponding to each of RATs, staying in the connection state in the current serving cell and supporting the RATs according to the number of UEs corresponding to each of RATs, staying in the connection state in the cell and supporting the RATs. Alternatively, the base station may determine the cell reselection parameters and/or the handover parameters for the cells by exchanging information with a adjacent cell on the number of PRBs occupied by UEs corresponding to each of RATs, staying in the connection state in the current serving cell and supporting the RATs according to the number of PRBs corresponding to each of RATs in the cell and supporting the RATs.

The control unit calculates and updates the cell reselection parameters and/or handover parameters of respective base stations. The control unit may be either located in a management entity of a higher level, such as a Mobility Management Entity (MME), which is connected to all base stations, or located in a certain specific base station. The control unit calculates the offsets between each base station and its adjacent cells according to the formula (5) as described above after receiving access probability information from respective base stations, the offsets with respect to its adjacent base stations, load information for distinguishing RATs and the like, and then broadcasts the offsets to respective base stations. For example, the base station 1 sends offsets $Q_{offset1,2}$, $Q_{offset1,3}$ ... $Q_{offset1,n}$ between the cell and adjacent cells 2, 3, ..., n to the control unit. Similarly, the base station n sends offsets $Q_{offsetn,1}$, $Q_{offsetn,2}$ ... $Q_{offsetn,n-1}$ between the cell and adjacent cells 1, 2, 3, ..., n to the control unit. These base stations may either send the information synchronously, or separately and periodically, or by event-triggered.

The control unit calculates the offsets between each cell and its adjacent cells for the base stations 1, ..., n according to the formula (5), after receiving the information from respective base stations. For example, the offsets between the base station 1 and the base station k is calculated according to $Q_{offset1,k}''=Q_{offset1,k}-(1-p_1)*\Delta Q_s+(1-p_k)*\Delta Q_s$, and the calculated offsets are transmitted to respective base stations. Each base station places the offsets into the cell reselection parameters to broadcast to the UE via an air wireless interface after receiving an updated offset from the control unit. Similarly, the control unit may calculate respective cell handover parameters according to the information received from the base stations, and transmit the calculated cell handover parameters to respective base stations. After receiving an updated handover parameter from the control unit, each base station broadcast the updated handover parameter to the UEs.

Figure 10A:
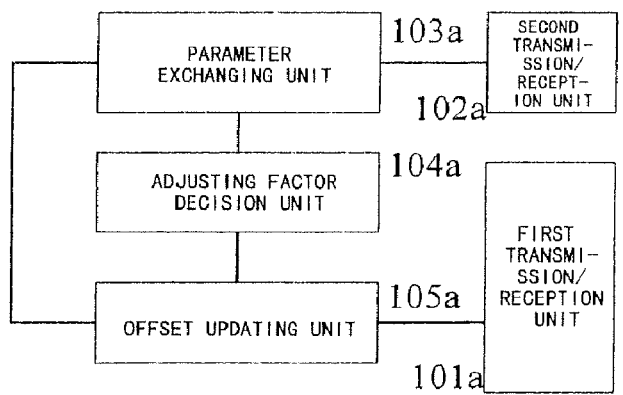
Figure 10B:
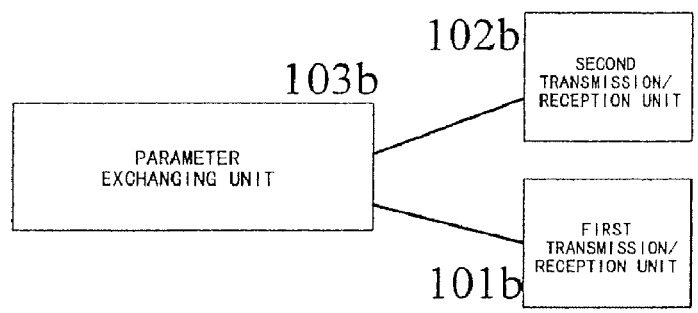
Figure 10C:
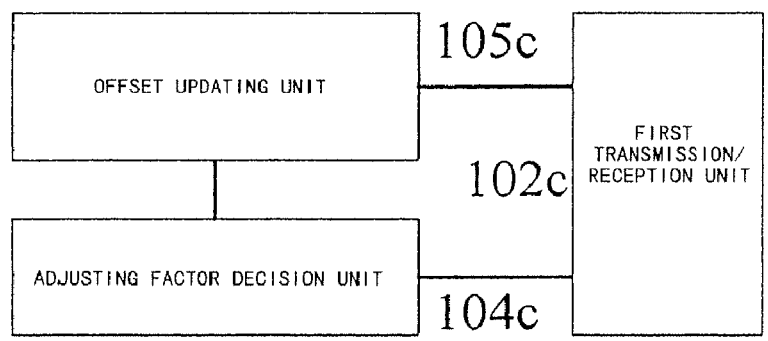

FIGS. 10a to 10c are schematic diagrams showing the cell reselection operations in a base station. It should be noted, for the sake of simplification, only the operations related with the present invention will be described, and the contents that are not closely related with the present invention will be omitted.

FIG. 10a shows a schematic diagram of an apparatus arranged at the base station for dynamically adjusting the cell reselection parameters according to the method as shown in FIG. 9. As shown in FIG. 10a, the cell reselection apparatus of this example comprises a first transmission/reception unit 101a, a second transmission/reception unit 102a, a parameter exchanging unit 103a, an adjusting factor decision unit 104a and an offset updating unit 105a. The first transmission/reception unit 101a transmits and receives information via a wireless interface. The second transmission/reception unit 102a exchanges information between base stations. The parameter exchanging unit 103a exchanges information such as the offsets between the base station and the adjacent base station n, the access probability values of the base station and the like with the adjacent base station n. The information may be transmitted either separately and periodically by the base station 1, or transmitted after receiving the updated exchanging information for base station n, as well by event-triggered. The adjusting factor decision unit 104a may acquire the adjusting factor according to the existing cell reselection parameters, or determine the adjusting factor according to load status of the current serving cell and/or the adjacent cells. The offset updating unit 105a calculates and updates the offsets between the current serving cell and the adjacent cell n according to the formula (5) as described above, and places the calculated offset into the cell reselection parameters to transmit to the UE by the transmission/reception unit.

FIG. 10b shows a simplified schematic diagram of a cell reselection apparatus for exchanging information such as the offsets, the access probability values, load status for distinguishing RATs and the like in a centralized manner at a base station side. As shown in FIG. 10b, the cell reselection apparatus of this example comprises a first transmission/reception unit 101b, a second transmission/reception unit 102b and a parameter exchanging unit 103b. The first transmission/reception unit 101b transmits and receives information via a wireless interface. The second transmission/reception unit 102b exchanges information between base stations and the control unit (as shown in FIG. 10c). The parameter exchanging unit 103b transmits information such as the offsets between the base station and the adjacent base stations, the access probability values of the base stations, load information for distinguishing RATs and the like to the control unit by use of the second transmission/reception unit 102b, and broadcasts the updated offsets and/or handover parameters to the UE by using the second transmission/reception unit 102b. The information may be either transmitted separately and periodically by this base station, or transmitted at a predetermined time agreed with other base stations, or by event-triggered. For example, the information is transmitted to UEs when the offsets between the base station and the adjacent base stations and/or the access probability values of the base station change. Herein, the offsets between the base station and the adjacent base stations may be either the offsets between the base station and any one of all adjacent base stations 1, . . . , n, or a part of the offsets which a change occurs.

FIG. 10c shows a simplified schematic diagram of a control unit for exchanging information such as the offsets and the access probability values in a centralized manner. As shown in FIG. 10c, the control unit comprises a first transmission/reception unit 102c, an adjusting factor decision unit 104c and an offset updating unit 105c. The first transmission/reception unit 102c exchanges information between the base stations and the control unit. The adjusting factor decision unit 104c may calculate the adjusting factor according to the cell reselection parameters received from respective base stations, or determine the adjusting factor according to load status and the cell reselection parameters of respective base stations, and sends the determined adjusting factor to the offset updating unit 105c to calculate a new offset and/or handover parameter. The offset updating unit 105c receives the access probability values of respective base stations from the first transmission/reception unit 102c, the offsets between each base station and its adjacent cells, and load information for distinguishing RATs, calculates and updates the offsets between each cell and its adjacent cells according to the formula (5), and transmits the calculated offsets and/or handover parameters to the base stations of each cell by use of the first transmission/reception unit 102c.

In the cell reselection method and apparatus provided in the second embodiment of the present invention, all changes are performed at the base station side and the control unit. FIG. 10c shows a simplified schematic diagram of the control unit. It should be noted that the control unit may be arranged either at the base station side, or at another network element. The UEs only need to read the cell reselection parameters of the current serving cell according to existing technical schemes, and then uses the existing method to calculate the cell reselection values to perform a decision without any changes. Therefore, operations performed at the base station side may also be applied in the traditional UEs with much stronger and wider adaptability in comparison with the method of the first embodiment in which the UE autonomously changes the cell reselection values.

Functions of each unit comprised in the cell reselection method and apparatus according to the second embodiment of the present invention can be implemented not only by the hardware loaded into the UEs and the base stations, but also by the software, or a combination of the hardware and the software. Those skilled in the art may implement the present invention with various methods by use of the concepts and schemes of the present invention described herein.

It should be noted that the above are only illustrated embodiments of the present invention, for those skilled in the art, there may be various alternations and modifications in the present invention without departing from the principle of the present invention. Any modifications, substitutions or improvements made within the spirit and principle of the present invention should fall into the protection scope of the present invention.

What is claimed is:

1. A method for performing cell reselection in a mobile communication system, comprising:
   reading, by a user equipment (UE), the Access Class (AC) barring parameters of the serving cell which are broadcast from a base station, and performing an AC barring check;
   calculating the cell reselection values of the serving cell and the adjacent cells according to the cell reselection parameters broadcast by the base station when the AC barring check fails; and
   ranking the calculated cell reselection values, and selecting by the UE the cell corresponding to the maximum value of the calculated cell reselection values as the serving cell of the UE.

2. The method according to claim 1, further comprising the UE subtracting a value related with the access probability values and an adjusting factor from the cell reselection values of the current serving cell when the UE calculates the cell reselection values.

3. The method according to claim 2, wherein the UE calculates the cell reselection values of the current serving cell and its adjacent cells according to the following formula:

$$R'_s = Q_{meas,s} + Q_{hyst} - (1 - p_{i,s}) * \Delta Q_s, \; R_n = Q_{meas,n} - Q_{offsets,n}$$

where $R'_s$ is the cell reselection value of the current serving cell, $R_n$ is the cell reselection value of the adjacent cell n; $Q_{meas,s}$ is the measuring value of RSRPs or RSRQs for the cell reselection of the current serving cell, $Q_{meas,n}$ is the measuring value of RSRPs or RSRQs for the cell reselection of the adjacent cell n; $Q_{hyst}$ represents a hysteresis value for the cell reselection, $Q_{offsets,n}$ represents an offset between the current serving cell and the adjacent cell n; $p_{i,s}$ is the access probability value corresponding to an AC i of the UE in the current serving cell; $\Delta Q_s$ is an adjusting factor indicating the adjusting range of the cell reselection parameter when the AC barring check fails.

4. The method according to claim 3, wherein the adjusting factor $\Delta Q_s$ is calculated by using the cell reselection parameters received by the UE.

5. The method according to claim 4, wherein the adjusting factor $\Delta Q_s$ equals to the sum of $Q_{hyst}$ and $Q_{offsets,n}$.

6. The method according to claim 4, wherein when there are a plurality of received $Q_{offsets,n}$, the adjusting factor $\Delta Q_s$ is calculated by adding the maximum value or the minimum value of the plurality of $Q_{offsets,n}$ to $Q_{hyst}$.

7. The method according to claim 4, wherein the adjusting factor $\Delta Q_s$ is determined according to the load of the current serving cell and the load of the adjacent cells, the bigger the load of the current serving cell is and the smaller the load of the adjacent cell is, the bigger the adjusting factor $\Delta Q_s$ becomes.

8. The method according to claim 1, further comprising subtracting a value related with the access probability values and an adjusting factor from the cell reselection values of the current serving cell, and subtracting a value related with the access probability values and an adjusting factor of the adjacent cell from the cell reselection values of the adjacent cell when the UE calculates the cell reselection values of the current serving cell and the cell reselection values of the adjacent cells respectively.

9. The method according to claim 8, wherein the UE calculates the cell reselection values of the current serving cell and its adjacent cells according to the following formula, $$R'_s = Q_{meas,s} + Q_{hyst} - (1 - p_{i,s}) * \Delta Q_s, \; R'_n = Q_{meas,n} - Q_{offsets,n} - (1 - p_{i,n}) * \Delta Q_s$$

where $R'_s$ is the cell reselection value of the current serving cell, and $R'_n$ is the cell reselection value of the adjacent cell n; $Q_{meas,s}$ is the measuring value of RSRPs or RSRQs for the cell reselection of the current serving cell, and $Q_{meas,n}$ is measuring value of RSRPs or RSRQs for the cell reselection of the adjacent cell n; $Q_{hyst}$ represents a hysteresis value for the cell reselection, $Q_{offsets,n}$ represents an offset between the current serving cell and the adjacent cell n; $p_{i,s}$ is an access probability value corresponding to an AC i of the UE in the current serving cell, $p_{i,n}$ is an access probability value corresponding to an AC i of the UE in the adjacent cell n; $\Delta Q_s$ is an adjusting factor indicating the adjusting range of the cell reselection parameters when the AC barring check fails, wherein n is an integer equal to or bigger than 1.

10. The method according to claim 9, wherein the adjusting factor $\Delta Q_s$ equals to the sum of $Q_{hyst}$ and $Q_{offsets,n}$.

11. The method according to claim 9, wherein when there are a plurality of received $Q_{offsets,n}$, the adjusting factors $\Delta Q_s$ is calculated by adding the maximum value or the minimum value of the plurality of $Q_{offsets,n}$ to $Q_{hyst}$.

12. The method according to claim 9, wherein the adjusting factor $\Delta Q_s$ is determined according to the load of the current serving cell and the load of the adjacent cell, the bigger the load of the current serving cell is and the smaller the load of the adjacent cell is, the bigger the adjusting factor $\Delta Q_s$ becomes.

13. An apparatus for performing a cell reselection in a mobile communication system, comprising:
at a user equipment (UE) side,
a transmission/reception unit to transmit and receive information via a wireless interface;
an Access Class (AC) barring check and decision unit to read the AC barring parameters, and performing an AC barring check and decision based on the read AC barring parameters;
a measuring unit to measure RSRPs or RSRQs of the current serving cell and its adjacent cells; and
a cell reselection value calculation and decision unit to perform the cell reselection operation according to the measuring result from the measuring unit, the AC barring parameters supplied from the AC barring check and decision unit and the received cell reselection parameters.

14. The apparatus according to claim 13, further comprising:
an adjusting factor decision unit arranged at a base station side to decide an adjusting factor for a covered cell according to the load status of the current serving cell and/or the adjacent cells; and
a transmission/reception unit to transmit and receive information via a wireless interface,
wherein the adjusting factor $\Delta Q_s$ represents the adjusting range of the cell reselection parameters when the AC barring check fails.

15. The apparatus according to claim 13, wherein the cell reselection value calculation and decision unit calculates and decides cell reselection values according to the AC barring check parameters read by the AC barring check and decision unit.

16. The apparatus according to claim 13, wherein the cell reselection value calculation and decision unit calculates the adjusting factor according to the cell reselection parameters received by the transmission/reception unit if the UE decides to determine the adjusting factor by itself.

17. The apparatus according to claim 16, wherein the cell reselection value calculation and decision unit determines the adjusting factor according to the load of the current serving cell and the load of the adjacent cells, and sends the determined result to the UE through the transmission/reception unit, the bigger the load of the current serving cell is and the smaller the load of the adjacent cell is, the bigger the adjusting factor $\Delta Q_s$ becomes.

18. A method for performing a cell reselection in a mobile communication system, comprising:
calculating, by a base station, cell reselection parameters and periodically broadcasting the calculated cell reselection parameters, Access Class (AC) barring parameters and system information to a UE in the mobile communication system;
receiving, by user equipment (UE), the cell reselection parameters and the AC barring parameters sent from the base station, and calculating cell reselection values of a current serving cell and its adjacent cells; and
ranking, by the UE, the calculated cell reselection values, and selecting the cell corresponding to the maximum value of the calculated cell reselection values as its serving cell.

19. The method according to claim 18, wherein calculating, by the base station, the cell reselection parameters comprises calculating, by the base station, the offsets between the current serving cell and at least one adjacent cell n, wherein n is an integer equal to or bigger than 1.

20. The method according to claim 19, wherein the base station calculates the offsets between the current serving cell and the adjacent cell n according to the following formula:

$$Q_{offsets,n}' = Q_{offsets,n} - (1-p_s)*\Delta Q_s$$

where $Q_{offsets,n}'$ denotes the adjusted offset between the current serving cell and the adjacent cell n, which is determined by the base station; $Q_{offsets,n}$ represents the offset between the current serving cell and the adjacent cell n before the adjusting, which is determined by the base station; $p_s$ denotes an access probability value corresponding to an AC of a normal UE in the current serving cell, and $\Delta Q_s$ is an adjusting factor indicating the adjusting range of the offsets between the current serving cell and the adjacent cells, which is performed by the base station.

21. The method according to claim 19, wherein the offsets between the current serving cell and the adjacent cell n is calculated by the base station according to the following formula:

$$Q_{offsets,n}'' = Q_{offsets,n} - (1-p_s)*\Delta Q_s + (1-p_n)*\Delta Q_s$$

where $Q_{offsets,n}''$ represents the adjusted offset between the current serving cell and the adjacent cell n, which is determined by the base station; $Q_{offsets,n}$ represents the offset between the current serving cell and adjacent cell n before the adjusting, which is determined by the base station; $p_s$ denotes the access probability value corresponding to the AC of the normal UE in the current serving cell; $p_n$ denotes the access probability value corresponding to the AC of the normal UE in the adjacent cell n; and $\Delta Q_s$ is the adjusting factor indicating the adjusting range of the offsets between the current serving cell and the adjacent cell, which is performed by the base station.

22. The method according to any one of claims 19 to 21, wherein the UE calculates cell reselection values of the current serving cell and at least one of its adjacent cell n according to the offsets, which are calculated by the base station, between the current serving cell and the at least one of the adjacent cell n.

23. The method according to claim 20, wherein the UE calculates the cell reselection values of the current serving cell and of its adjacent cell n according to the following formula:

$$R_s = Q_{meas,s} + Q_{hyst}, \quad R_n = Q_{meas,n} - Q_{offsets,n}'$$

where $R_s$ is the cell reselection value of the current serving cell, $R_n$ is the cell reselection value of the adjacent cell n; $Q_{meas,s}$ is the measuring value of RSRPs or RSRQs for the cell reselection of the current serving cell, and $Q_{meas,n}$ is the measuring value of RSRPs or RSRQs for the cell reselection of the adjacent cell n; $Q_{hyst}$ represents the hysteresis value of the cell reselection, and $Q_{offsets,n}'$ represents the offset between the current serving cell and the adjacent cell n.

24. The method according to claim 21, wherein the UE calculates the cell reselection values of the current serving cell and its adjacent cell n according to the following formula:

$$R_s = Q_{meas,s} + Q_{hyst}, \quad R_n = Q_{meas,n} - Q_{offsets,n}''$$

where $R_s$ is the cell reselection value of the current serving cell, $R_n$ is the cell reselection value of the adjacent cell n; $Q_{meas,s}$ is the measuring value of RSRPs or RSRQs for the cell reselection of the current serving cell, and $Q_{meas,n}$ is measuring value of RSRPs or RSRQs for the cell reselection of the adjacent cell; $Q_{hyst}$ represents the hysteresis value of the cell reselection, and $Q_{offsets,n}''$ represents the offsets between the current serving cell and the adjacent cell n.

25. The method according to claim 23 or 24, wherein $Q_{hyst}$, $Q_{offsets,n}'$ and $Q_{offsets,n}''$ are cell reselection parameters of the current serving cell, and are contained in the system information of the current serving cell and are broadcast to the UE by the base station.

26. The method according to claim 18, further comprising exchanging offsets and access probability values between the base station of the current serving cell and the base stations of the adjacent cells.

27. The method according to claim 26, wherein the offsets and access probability values are exchanged between the base stations in a distributed manner.

28. The method according to claim 26, wherein the offsets and access probability values are exchanged between the base stations in a centralized manner by using a common control unit.

29. The method according to claim 27 or 28, wherein the base stations periodically send the access probabilities of the current serving cell and the offsets between the current serving cell and the adjacent cells to the common control unit or the adjacent base stations.

30. The method according to claim 27 or 28, wherein the base station sends the latest information to the common control unit or the base stations of the adjacent cells only when the base station detects that there is a change in its offsets and/or access probabilities.

31. The method according to claim 18, further comprising:
the base station exchanging information with the adjacent cells on the number of UEs corresponding to each of Radio Access Technologies (RATs), being in a connection state in the current serving cell and supporting the RATs; and
the base station determining the reselection parameters and/or handover parameters according to the information on the number of UEs corresponding to each of RATs, being in a connection state and supporting the RATs in the current serving cell and the adjacent cells.

32. The method according to claim 18, further comprising:
the base station exchanging information with the adjacent cells on the number of the Physical Resource Blocks occupied by UEs corresponding to each of Radio Access Technologies (RATs), being in a connection state in the current serving cell and support the RATs; and
the base station determining the reselection parameters and/or handover parameters according to the number of the Physical Resource Blocks occupied by UEs corresponding to each of Radio Access Technologies (RATs), and supporting the RATs in the current serving cell and the adjacent cells.

33. An apparatus for performing a cell reselection in a mobile communication system, comprising:
an adjusting factor decision unit to determine an adjusting factor according to cell reselection parameters received from respective base stations or load status and cell reselection parameters of respective base stations;
an offset updating unit to receive access probabilities of respective base stations, offsets between the base station of the current serving cell and the base stations of the adjacent cells, and cell reselection parameters of respective cells, and for calculating and updating the offsets between the current serving cell and the adjacent cells and/or the handover parameters; and
a transmission/reception unit to exchange information between the base stations, or between the base stations and a control unit.

34. The apparatus according to claim 33, further comprising a parameter exchanging unit to exchange with the adjacent base stations or the control unit the offsets between the base station and the adjacent base station n, the access probability of the base station, and the number of UEs corresponding to each of Radio Access Technologies (RATs), being in a connection state in the current serving cell and supporting the RATs, or the number of the Physical Resource Blocks occupied by UEs corresponding to each of Radio Access Technologies (RATs), being in a connection state in the current serving cell and supporting the RATs.

35. The apparatus according to claim 33, wherein the adjusting factor decision unit determines the adjusting factor according to the load of the current serving cell and the load of the adjacent cell, and sends the determined result to the offset updating unit to calculate and update the offsets and/or the handover parameters, the bigger the load of the current serving cell is and the smaller the load of the adjacent cell is, the bigger the $\Delta Q_s$ becomes.

* * * * *